United States Patent [19]

Fux

[11] 3,993,568
[45] Nov. 23, 1976

[54] SLUDGE SETTLING BASIN
[75] Inventor: Kamil Fux, Schiebel, Switzerland
[73] Assignee: Prometall Uznach AG, Uznach, Switzerland
[22] Filed: Oct. 9, 1975
[21] Appl. No.: 621,003

Related U.S. Application Data
[63] Continuation of Ser. No. 460,446, April 12, 1974, abandoned.

[30] Foreign Application Priority Data
Apr. 16, 1973 Switzerland.......................... 5426/73
Nov. 19, 1973 Switzerland........................ 16205/73

[52] U.S. Cl................................ 210/527; 210/530; 210/532 R
[51] Int. Cl.²........................................ B01D 21/24
[58] Field of Search ............ 210/83, 112, 527, 528, 210/529, 530, 531, 532, 533, 534, 535

[56] References Cited
UNITED STATES PATENTS
2,236,128   3/1941   Poole............................. 210/530 X
3,298,529   1/1967   Longnecker..................... 210/528 X
3,337,057   8/1967   Bolton ................................ 210/527
3,349,030   10/1967  Savage............................. 210/528 X
3,669,271   6/1972   Mc Givern...................... 210/527 X
3,847,802   11/1974  Lemke ................................ 210/527

FOREIGN PATENTS OR APPLICATIONS
235,872   1/1926   United Kingdom................. 210/527

Primary Examiner—Thomas G. Wyse
Assistant Examiner—Robert G. Mukai
Attorney, Agent, or Firm—Flynn & Frishauf

[57] ABSTRACT

A sludge settling basin in which a platform is movable over the basin and supports a siphon tube having a first portion extending to adjacent the floor of the basin, a second portion extending over the basin and a third portion extending downwardly into the channel of the side wall of the basin, the material in the channel being removed by a pump with a sufficient rate for the level of liquid in the channel always to be below the level of liquid in the settling basin, so that the sludge is siphoned from the basin into the channel and is removed by the pump.

2 Claims, 5 Drawing Figures

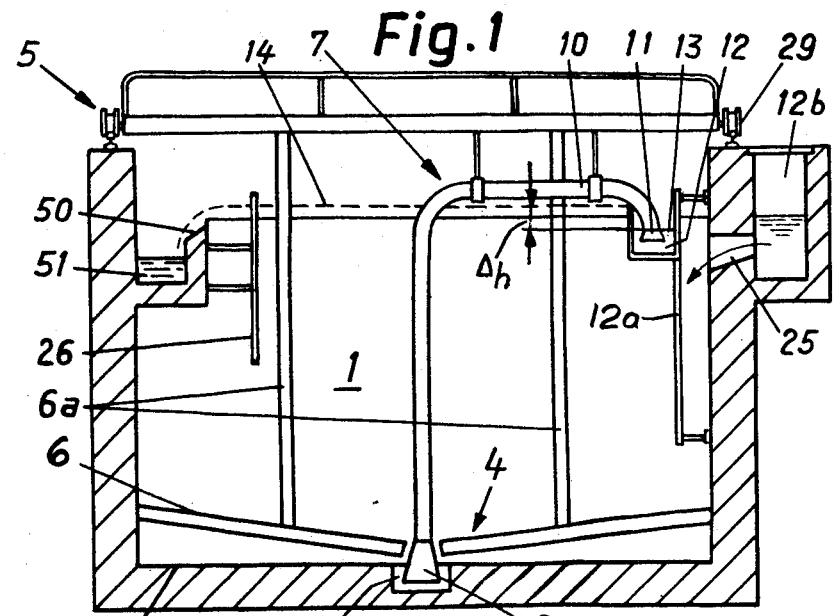
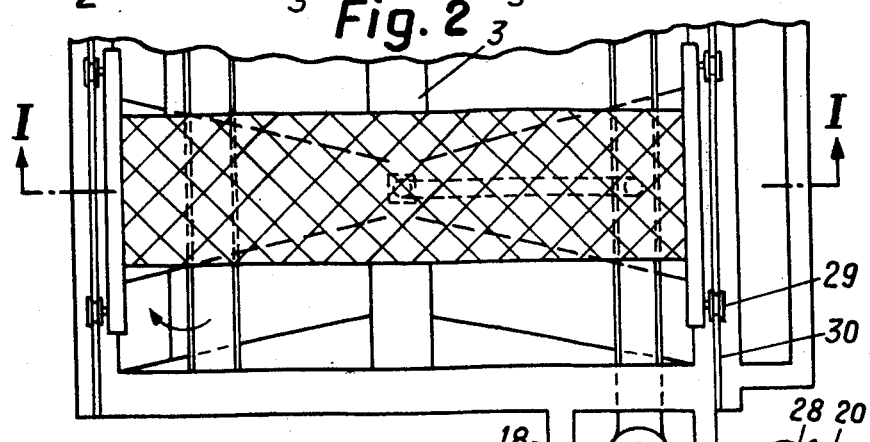
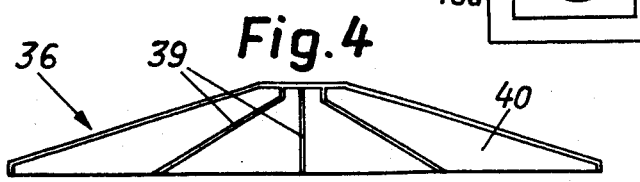
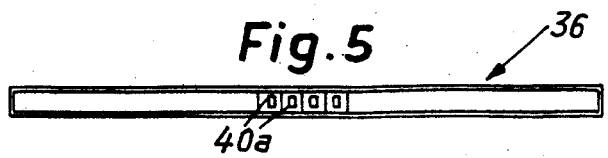

SLUDGE SETTLING BASIN

This is a continuation of application Ser. No. 460,446, filed Apr. 12, 1974 and now abandoned.

The present invention relates to a sludge settling basin, especially of a biological final settling basin.

Devices are already known for removing, from a settling basin, the sludge which collects on the floor thereof. Thus chain-type clearing machines are already known which continuously pick up the sludge on the floor of the basin and convey it in the direction of a pump sump. The sludge is conveyed out of the settling basin by a pump. It is a disadvantage that the chain-type clearing machine is expensive both to manufacture and install and also to operate and maintain.

Shield-type clearing machines are also known, which are suitable for basins of medium size and which, similarly to the case of the chain-type clearing machine, convey the sludge collecting on the floor of the basin into a pump sump by means of a clearing shield or plate. However, a disadvantage is the discontinuous operation of the clearing shield, which must be raised up during the return travel, so that the pump in question is put under load in surges, causing the possibility of blockage and the discontinuous charging of the subsequent sludge treatment installations. The operation can partially be evened out by the so-called stepwise system, in which about a third of the entire basin length is cleared in the first process step, two thirds are cleared in the second process step and the entire length of the basin is cleared in the third process step.

Suction clearing machines are also known, which continuously clear the sludge from the floor of the basin by means of the travelling bridge of the clearing machine. Here, the floor of the basin is cleaned over its entire width, similarly to the effect of a vacuum cleaner; however, it is difficult uniformly to suck off the sludge over the entire width. In a known further embodiment, the sludge layer is therefore first conveyed by means of guide blades into a lower-lying channel, where the sludge is sucked off by means of a pump. Admittedly, this makes it possible to keep the floor of the basin clean even after prolonged use, but it is a disadvantage that the amount sucked off must be regulated with the aid of expensive electrical devices which are above all installed on the moving bridge of the clearing machine, for example regulated by a DC drive or some other electrical adjustable drive. Furthermore, the electrical installation provided on the bridge of the clearing machine, including the supply cable, requires a great deal of servicing.

The settling basin from which the sludge is sucked off by means of the controllable pump which has been mentioned is, in the case of a biological sewage farm, the final settling basin, which is fed from a preceding aerating basin. In order to optimise the operation of such a sewage farm, the optimum possible conditions for microscopic life must be maintained in the aerating basin. Since variable conditions which cannot be influenced prevail in the infeed to the aerating basin, these optimum conditions in the aerating basin are aimed at firstly through introducing oxygen and secondly through recycling fresh sludge from the final settling basin, the fresh sludge being conveyed by means of a further pump installation, the delivery of which is regulated by measuring the operating conditions in the aerating basin, for example the oxygen content. It is a disadvantage that optimum regulating of a biological sewage farm, whilst achievable with means known at the present time, requires disproportionately great expense.

The invention provides an apparatus for settling sludge, such apparatus comprising, a settling basin having a floor and side wall, a platform movable over said basin, a channel on one of the side walls of the basin, a siphon tube having a first portion extending upwardly from adjacent the floor of the basin, a second portion extending transversely over said basin and a third portion extending downwardly into said channel, and a controllable pump connected to pump material from said channel.

In order that the invention will more readily be understood the following description is given, merely by way of example, reference being made to the accompanying drawings in which:

FIG. 1 is a vertical section taken along line I—I in FIG. 2, through one embodiment of settling basin according to the invention;

FIG. 2 is a plan view of one end of the settling basin of FIG. 1, with the movable platform in the vicinity of the end of the basin;

FIGS. 4 and 5 are a vertical section and a plan view respectively of the mouthpiece of the siphon tube of the settling basin of FIG. 3.

Figure 3:
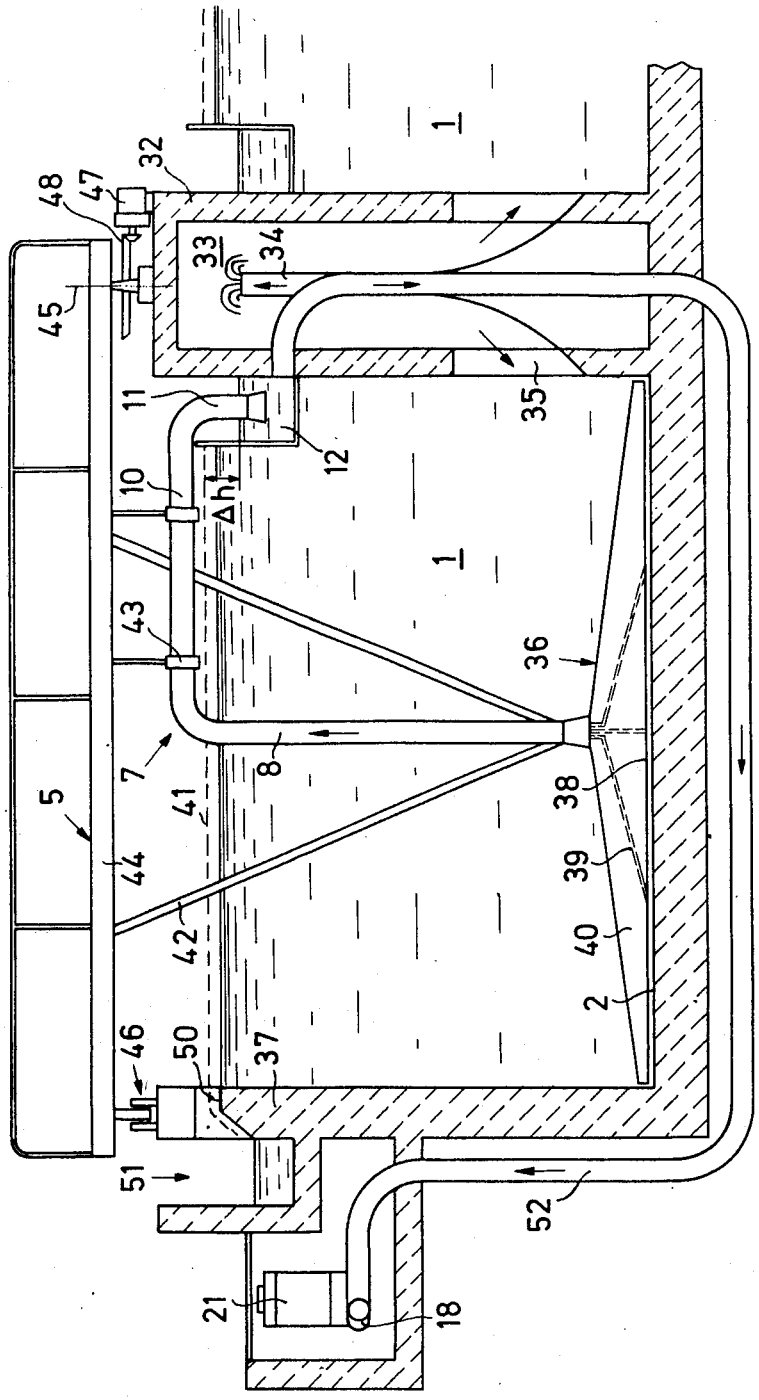
FIG. 3 is a vertical section, similar to FIG. 1, of a second embodiment of settling basin according to the invention.

FIGS. 1 and 2 represent a final clearing settling basin 1 for a sewage farm, the basin being rectangular in plan, with the floor 2 of the basin sloping towards a suction channel 3 located along the longitudinal axis of the basin 1. The sludge collecting on the floor 2 of the basin is conveyed into the suction channel 3 by a device 4 which includes clearing blades 6 mounted on a travelling overhead platform bridge 5 by support bars 6a. A siphon tube 7, which has a first vertical portion arm 8 with a flared suction inlet 9 located in the suction channel 3, is suspended from the platform 5. The vertical portion 8 of the pipeline is connected to a second horizontal portion 10, and a third downwardly directed portion 11 which dips into a collecting channel 12 located on the long side of the basin 1. The channel 12 is fixed to a calming partition 12a which is located at a distance from one side wall of the basin 1 and which serves to allow the water which runs, for example, from an aerating basin into a channel 12b, to run without interference into the basin 1 through an inlet 25. A similar partition 26 is located at a distance from an overflow 50 of a drainage channel or launder 51, in order here again to prevent interference from the water running out.

It is important that the level 13 of the collecting channel 12 should be lower, by an amount marked $\Delta h$ (FIGS. 1 and 3) than the level of the basin 1. As a result, the siphon tube 7 can be used as a device for conveying the sludge, collecting in the suction channel 3, into the side channel 12. A controllable pump 18 suitable for sucking off the sludge is located at the end of the side channel 12 and conveys the sludge from the basin 1, through pipelines 19, 20 provided with adjustable slide valves 27, 28 into an aerating basin and/or to a sludge pit. A variable drive (not shown in FIG. 1) of the pump 18 can be electrical, mechanical or hydraulic and can, since the pump 18 is mounted in a fixed position, be accommodated in a protected location, for example in a covered pit 18a. However, it is also possible to fit two controllable pumps 18, each with a pipeline 19 and 20 respectively.

Vacuum is required for putting the siphon tube 7 into operation and can be generated, for example, by means of a jet apparatus which can be connected to the horizontal run 10.

The platform 5 is moved to and fro by means of a drive which is not shown, for example a cable drive, whilst the sludge which arises in the suction channel 3 is continuously sucked off during the movement in either direction. The platform 5 runs on rails 30 by means of rollers 29.

It is important that the delivery of the siphon tube 7 can be regulated extremely simply by appropriately maintaining the level difference $\Delta h$. This can be achieved by suitably adjusting the delivery of the pump 18 at the end of the side channel 12.

As soon as the siphon pipeline 7 is put into operation, the sludge begins to be sucked off continuously along the suction channel 3 of the basin 1, and at the same time the clearing blades 6, mounted by means of bars 6a on the platform 5, convey the sludge from the floor of the basin to the suction channel 3.

FIG. 3 illustrates a modified form of final settling basin 1a, like reference numerals being for like parts. In this construction, the basin is circular and has, in the centre, an inlet construction 32 in the form of a hollow column. The pre-clarified effluent flows into the cavity 33 of the inlet construction 32 through a pipeline 34 and flows into the final settling basin 1 through orifices 35 provided at the foot of the hollow column 32. The sludge which sediments in the basin 1a collects on the flat floor 2 of the basin and is sucked off through a mouthpiece 36 which extends over the entire width of the annular cross-section formed by the inlet construction 32 and the outer wall 37. The mouthpiece 36 has a narrow suction slit 38 which faces the basin floor 2 and also extends over the entire width, and which is divided by partitions 39 into component channels 40 which at the upper end of the mouthpiece 36 terminate in the vertical portion 8 of the siphon tube 7.

FIGS. 4 and 5 show the mouthpiece 36 by itself. The partitions 39 are so arranged that the orifice which faces the basin floor 2 is divided into orifices of equal size. However, this does not suffice to ensure uniform sucking-off over the entire basin floor 2. For this purpose, the component channels 40 which terminate in the vertical pipeline arm 8 are throttled, with the corresponding throttle orifices 40a being of such size as to ensure uniform sucking-off of the entire basin floor 2.

The horizontal run 10 which adjoins the vertical portion 8 of the siphon tube runs immediately above the operating level, marked 41, of the basin 1 and merges into a vertical orifice 11 which dips in a collecting channel 12 located on the outside of the inlet construction 32. The siphon tube 7 is in its turn fixed by means of struts 42 and pipe clips 43 to the portion 44 of the platform 5, which rotates about the central axis 45 of the basin 1, by means of a drive 46, on the rim of the outer wall 37 of the basin 1. The platform 5 is driven, for example, through driving the axle 45 by means of a set of gears 47, 48 driven by an electric motor.

Suitably, the horizontal run 10 which forms the apex of the siphon tube 7 is located only just at such a level above the operating level 14 of the basin 1 that it cannot dip into the latter, and this ensures extremely stable operation and allows additional safety measures to be dispensed with.

It is advantageous that the collecting channel 12 which is constructed as a side channel should be located on the inlet construction 32 which is in the form of a central column, and should surround the latter as an annular channel. This arrangement avoids providing a peripheral collecting channel which would be extremely expensive because of its great length. In addition, the horizontal portion 10 of the siphon tube 7, could not be located so near to the operating level of the settling basin 1, because of the drainage channel 51 which is fed from the final settling basin 1 via an overflow 50, and because of the rim of the outer wall 37 which acts as a running track for the platform 5.

In the collecting channel 12, the sludge is removed by means of a pipeline 52; this is constructed as a siphon and runs vertically in the inlet construction 32 and thereafter underneath the basin 1 and then upwardly to end in the inlet of the adjustable feed pump 18, provided with a variable drive 21, from where the sludge is conveyed into the aerating basin and/or into the sludge pit. The level difference $\Delta h$, which determines the amount delivered by the siphon tube 7, is maintained by the regulated pump 18, via the pipeline 52. Here again the use of two regulated pumps 18 is possible.

In the equipment described, the entire electrical drives and installations can be located outside the platform 5 and the basin 1. Both the drive mechanism of a cable drive, and the drive 47, 48, and also the regulated pump 18 for removing the sewage sludge are arranged in fixed positions, so that no critical pipeline connections, subject to corrosion, from the fixed to the movable parts are necessary. Of course, the travelling mechanism 46 can also be provided with a motor drive, in which case the power supply must then be constructed appropriately, for example using a contact rail.

It is however also possible to employ the mouthpiece 36, used in FIG. 3, in a longitudinal basin according to FIG. 1, instead of the clearing device 6, 6a used in FIG. 1. This does not affect the operation of the siphon tube 7. What is important is that the two feed devices 7 and 18, arranged in series, can be operated in such a way that only the second feed device 18 is regulated.

I claim:

1. Apparatus for settling sludge, said apparatus comprising:
   a settling basin having an essentially flat floor and essentially vertical side walls;
   a platform rollably mounted on the settling basin structure for movement over said basin;
   a fixed channel located on one of the side walls of the said basin;
   a siphon tube secured to the platform and movable therewith, consisting essentially of
   a mouthpiece defining a suction gap which extends over the entire width of the basin floor, the mouthpiece being formed with internal partitions subdividing said suction gap of said mouthpiece into component channels and disposed in convergent positions to reduce the cross section of the channels from the suction gap to the upper end of the mouthpiece,
   a first tube portion connected to the mouthpiece extending directly upwardly from adjacent the floor of the basin,
   a second portion directly extending horizontally and transversely over said basin and suspended below the platform at a fixed height only slightly above the maximum level of liquid in the settling basin, and a third portion extending downwardly into said channel;

and a controllable pump positioned at a fixed location with respect to said basin, the pump having a variable delivery rate and being in hydraulic communication with said channel and connected to pump material from said channel to control flow through the siphon tube due to the level difference between the materials in the settling basin and the channel by controlling the delivery rate of the pump pumping material from the channel.

2. Apparatus as claimed in claim 1, wherein said settling basin is circular in plan outline and has an outer circular side wall and further comprises an inlet construction arranged centrally of said circuit basin defining said one side wall;

said channel is annular in construction and is secured to said inlet construction;

and the apparatus further comprises a tube connecting said channel to said pump, said tube extending downwardly through said inlet construction, below the floor of the basin out to a location laterally outside said settling basin said pump being situated at said lateral location.

* * * * *